Dec. 12, 1967  E. L. MEDFORD, JR., ET AL  3,357,564
FILTERING APPARATUS AND METHOD OF MAKING IT
Filed Sept. 22, 1964
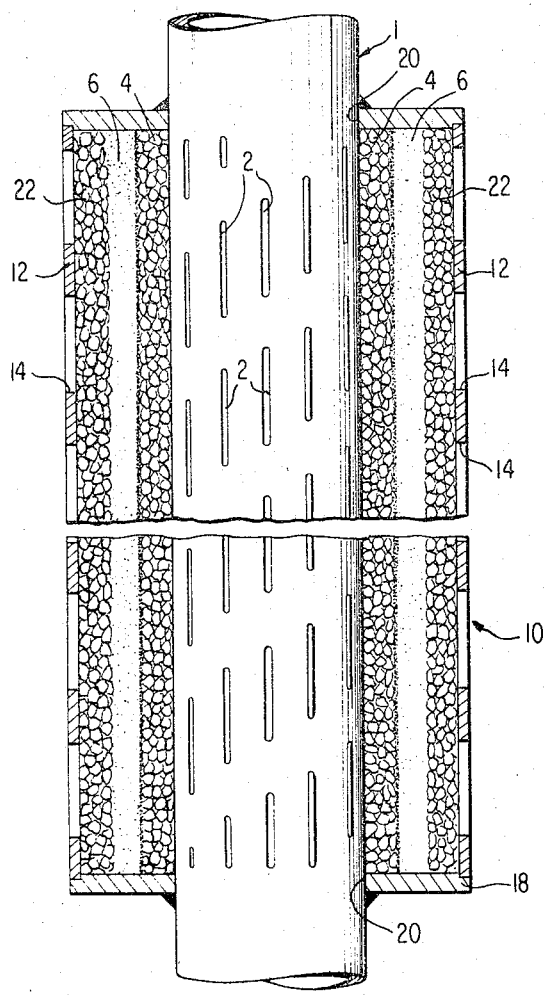
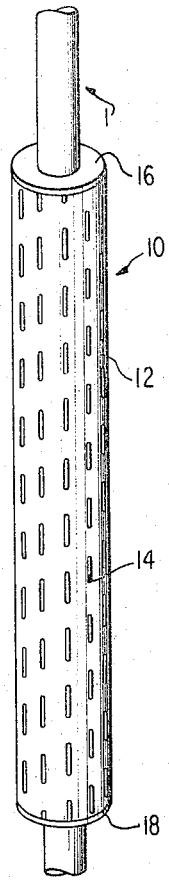
INVENTORS
ERSKIN L. MEDFORD, JR.
LLOYD C. KNOX
ATTORNEYS United States Patent Office 3,357,564
Patented Dec. 12, 1967

3,357,564
FILTERING APPARATUS AND METHOD
OF MAKING IT
Erskin L. Medford, Jr., and Lloyd C. Knox, Duncan, Okla., assignors to Halliburton Company, Duncan, Okla., a corporation of Delaware
Filed Sept. 22, 1964, Ser. No. 398,164
8 Claims. (Cl. 210—266)

ABSTRACT OF THE DISCLOSURE

A method of assembling a generally cylindrical well filter comprising unitizing an annular mass of granular filtering material and bonding this material to one cylindrical wall of a filter unit and interposing loose granular material between the unitized annular mass and another cylindrical wall of the filter.

A generally cylindrical well filter including a first, generally annular, granular filtering mass unitized and bonded to a cylindrical wall and a second generally granular loose mass interposed between the bonded mass and another cylindrical wall of the filter.

General background of invention

This invention relates generally to screen apparatus for use in well bores, and more particularly, to methods of fabricating well screens of the sand filtering material type and the resulting apparatus.

Fluid bearing earth formations frequently are composed of poorly consolidated granular material. In well bores drilled into sucn formations to extract fluid therefrom, there is a tendency for the formation material to move with the formation fluid into the well bore. When such occurs the granular formation material may compact about the fluid receiving end of a production string of tubing lowered into the well bore to receive the formation fluid thereby reducing the effective radius of the well bore and decreasing well productivity.

To prevent the undesirable results caused by such accumulation of granular material in a well bore around the fluid receiving end of a production string, a screen device may be mounted thereon. An appropriate screen device may be designed to have a radius substantially larger than that of the fluid receiving end of the production string and therefore, in addition to functioning as a filter to clean the fluid flowing into the string, the screen may also function to prevent an accumulation of granular material around the string per se. In this manner a predetermined radius of constant permeability in the production zone of the well may be maintained.

Heretofore, screens composed of granular material sucn as sand have been utilized. In fabricating such screens, it has been found to be advantageous to bond the sand of the filtering element to the production string through utilization of a thermo-setting resin. In such screens, the resin bonding is relied upon to maintain structural integrity of the composite filtering element and the connection thereof to the production string. Although such bonded sand screens are known to offer significant advantages in certain environment, such screens are not always satisfactory when the temperature in the well bore exceeds the breakdown temperature of the thermo-setting resin bonding material of the screen. Upon the occurrence of such high temperatures, as for example over 350° F., the structural integrity of these bonded sand screens may tend to break down with obvious undesirable effects on screen efficiency and longevity and well productivity.

Objects and general summary of invention

It is an object of this invention to provide a sand screen for use in well bores providing increased filtering efficiency, permitting increased well productivity, and offering increased screen longevity.

It is another object of this invention to provide a sand screen for use in well bores wherein a high degree of diffusion of formation fluid about the primary filtering element is promoted thereby inducing an increased flow therethrough.

It is a further object of this invention to provide such a sand screen wnerein the accumulation of filtered material within the primary filtering element may be reduced.

It is still another object of this invention to provide such a sand screen that lends itself to back-flushing procedures to clean the accumulation of filtered material from the primary filtering elements with a high degree of cleaning efficiency and without damage to the filtering element.

A further object of this invention is to provide a resin bonded sand screen for use in well bores wnerein the temperature may exceed the breakdown temperature of the resin bond without damage to the screen regardless of flow direction.

Another object of this invention is to provide a method of fabricating such a sand screen that not only offers advantages in ease in assembly but also results in an improved screen permitting increased well productivity and inducing ease in cleaning through back-flushing.

It is still another object of this invention to provide an apparatus for filtering fluid in well bores in fluid bearing earth formations providing enhanced filtering efficiency.

In achieving these and other objects that will be apparent hereinafter, this invention provides a screen apparatus for use in well bores, the apparatus comprising longitudinally extending conduit means having radially extending openings. Formation fluid is filtered through a fluid permeable screen of granular material positioned about the openings in the conduit means, the screen comprising and the fluid being directed through a first layer of relatively coarse granular material encompassing the conduit means, a second layer of relatively fine granular material encompassing said first layer, a third layer of relatively coarse granular material encompassing the second layer. Means for retaining said layers about the conduit means are also provided.

The means for retaining the multiple layers of granular materials about the conduit means may include a resin bond between certain of the layers and/or a perforated housing about the layers.

Further, although certain of the multiple layers may be resin bonded, at least one of said layers may be loosely packed adjacent other of said layers and within the perforated housing.

Still further, the present sand screen may be assembled by resin bonding at least one of said layers of granular material, positioning a portion of the screen housing about the perforated portion of the production string so that a space remains adjacent the bonded layer, loosely packing a second layer of granular material in said space adjacent said bonded layer, and closing said housing so as to retain said layers therein.

Drawings

The detailed characteristics of the well screen of this invention will be set forth in the context of a preferred embodiment illustrated in the accompanying drawings in which:

FIGURE 1 is a vertical, cross-sectional view of the instant well screen shown positioned about a perforated lower end of a production string; and FIGURE 2 is a perspective view, on a reduced scale, of the sand screen positioned as shown in FIGURE 1.

General description

Referring in more detail to FIGURE 1 of the drawings, the instant well screen is positioned on a lower portion of a metallic, tubular production string 1. The lower portion of the production string is provided with a plurality of spaced, elongated, radially extending openings 2 arranged in helical fashion about the periphery of the production string 1. The opening size may vary in design, but, for example, may be approximately 2" long and 1/16" wide.

Bonded about and fixed to the lower perforated portion of the production string 1 is a first cylindrical layer of relatively coarse sand 4. The granules of the layer 4 are preferably rounded or, at least subangular in shape and are of an average particle size which is less than the width of the elongated openings 2 in the production string 1.

Bonded about and fixed to the first cylindrical layer 4 is a second cylindrical layer of sand 6. The granules of this second layer 6 are of a relatively fine particle size, as compared to the relatively coarse particle size of the layer 4. The fine sand of the layer 6, for example, might be a round Ottawa sand ranging in size between 20 and 40 mesh. This sand, when consolidated and bonded with a thermo-setting resin such as epoxy resin, has been found to have a permeability of approximately 50 darcys. It is this second layer 6 that functions as the primary filtering medium for the formation fluid.

Fixed about the lower perforated portion of the production string 1 and the cylindrical layers 4 and 6, is a metallic perforated cylindrical housing 10, the circular vertically extending side wall 12 of which is provided with a plurality of elongated, radially extending openings 14 helically arranged, in spaced relation, about the periphery of the side wall 12 of the housing. The openings 14 may be of any appreciable size but preferably are equal in size to the opening 2 in the production string 1. Fixedly connected, as by welding or the like, the upper and lower extremities, respectively, of the side wall 12, are circular upper and lower plates 16 and 18, each having a centrally located circular aperture 20 for receiving a tubular production string 1. The upper and lower plates 16 and 18 extend radially outwardly beyond the periphery of the second layer 6 and may be fixedly connected adjacent the aperture 20 to the string 1 as by welding or the like. The housing 10 is dimensioned so that an annular space is present between the inside annular face of the wall 12 and the outer periphery of the second layer 6.

Loosely packed in the annular space between the second layer 6 and the side wall 12 of the housing 10 is a third layer of sand 22, this third layer being of relatively coarse particle size, which may be generally like that of the first layer 4, but in any case, is of an average particle size which is greater than the width of the elongated openings 14. It should be noted that certain of the advantages of the instant invention may be achieved if other than the first and second layers are bonded and if other than the third layer is loosely packed.

Assembly of the instant well screen is preferably accomplished as follows. The first layer 4 is bonded about the perforated string 1, after which the second layer 6 may be bonded to the first layer 4. At this point, the bonded layers are partially encased by several elements of the housing, as by fixing the bottom plate 18, having the side wall 12 fixedly connected thereto, on the string 1 as by welding or the like. Subsequently, the sand of the outside layer 22 may be loosely packed in the annular space between the outside periphery of the cylindrical layer 6 and the inside periphery of the side wall 12. Upon completely filling the space between the second layer 6 and the side wall 12, the upper plate 16 is fixedly connected to the string 1 and the upper end of the side wall 12. It will be seen that no difficulty is encountered in fabricating the housing so as to be closely fitted about the multiple layer sand screen.

As previously stated the sand of the first and third layers 4 and 22 is selected so as to have a particle size larger than the width of the elongated slots 2 and 14, in the production string 1 and wall 12, respectively. In addition, a sand is selected that has a particle size such that the average interstitial distance between the particles thereof is somewhat less than the average particle size of the relatively fine sand of the second cylindrical layer 6. In this manner, the fine sand of the second but primary filtering layer 6 is segregated from the slots of wall 12 and the perforated string 1 by layers of coarse particle size sand. Remembering that the first and second layers 4 and 6 are bonded, if the breakdown temperature of the resin bonding is exceeded, migration of the fine particles of the second layer 6 through the openings 2 and 14 is prohibited by the layers 4 and 22. For this reason, relatively larger openings may be provided in the string 1 and wall 12 than otherwise possible thereby permitting increased productivity and increased formation fluid flow through the screen without danger of the loss of the fine particles of the second layer through enlarged openings 2 upon the occurrence of high well temperatures.

Similarly, during a back-flushing operation, the third cylindrical layer 22 of coarse particle size sand permits the utilization of larger openings 14 in the side wall 12 without the danger of migration of the fine particle sand of the second layer 6 therethrough, this second layer being retained in its position by the coarse particle size sand of the layer 22.

Further, it has been found that these coarse particle size layers on either side of the fine particle size layer aid in diffusing fluid flow from the openings 2 and 14 about the periphery of the second cylindrical layer 6 thereby permitting greater flow efficiency, in either direction, through the fine sand of the primary filtering layer. It will be appreciated that during production formation fluid flow enters the openings 14 to be diffused by the layer 22 about the outside periphery of the primary filtering layer 6, after which the flow is directed through the coarse layer 4 to the openings 2 in the string and finally to the surface above the well. Concerning flow in the opposite direction, the diffusion of flow provided by the first coarse layer 4 is significant in a back-flushing operation wherein fluid is pumped down to the string 1 through the openings 2 and diffused by the layer 4 about the inside periphery of the primary filtering layer 6 thereby enhancing the cleaning action of the primary filtering layer 6 during the back-flushing procedure.

It will be clear that, although the fine particle size layer 6 is considered to be the primary filtering element, the coarse particle size layers 4 and 22 and to an extent, the slotted housing also, perform a filtering function. In this regard, the third layer 22 is particularly significant as it acts to block the entry of large particles of material carried in the formation fluid which would immediately plug the relatively small interstices between the fine particles of the layer 6.

The feature of the instant well screen wherein one of the layers is loosely packed between the adjacent layers or layer and the side wall 12 is functionally significant for several reasons. It will be apparent that this loosely packed layer permits a degree of differential expansion of the various elements of the bonded sand screen and housing that might otherwise be detrimental to the structural integrity of the overall screen. But still further, because the sand of the third layer 22 is packed so as to fill the annular space between the second layer 6 and the side wall 12, no space is permitted to remain between the outside periphery of the third layer 22 and the side wall 12. By the complete filling of the interior of the housing 10, no fluid is permitted to accumulate between the layer 22 and the adjacent element as might be the case if a space remained therebetween. The particles in the fluid accumulated in such a space, if one were permitted to exist, would tend to accumulate in this space by sedimentation thereby plugging the interstices between the particles of the adjacent layer, below the sediment line. Still further, should a portion of the adjacent layer become plugged, the particles of the loose layer are permitted to reorient themselves to direct flow to those portions of the adjacent layer 6 that remains unplugged.

It should be noted that granular material other than the specified sand and resins other than epoxy resins may be utilized within the concept of this invention. Further, it should be noted that although the preferred embodiment includes three cylindrical layers of appreciable and equal wall thickness, the wall thickness of these layers may be varied in magnitude independent of one another, as so also may the shape be varied.

Other known modifications will be readily obvious to those skilled in the art which are well within the scope of the invention as defined in the accompanying claims.

We claim:

1. A screen apparatus for use in well bores, said apparatus comprising longitudinally extending conduit means having radially extending openings, a fluid permeable screen of granular material, said screen comprising a first layer of relatively coarse granular material encompassing said conduit means, a second layer of relatively fine granular material encompassing said first layer, a third layer of relatively coarse granular material encompassing said second layer, at least one of said layers being of a unitary bonded construction, and a housing connected to said conduit means and encasing said layers and including at least one generally cylindrical wall bonded to said one of said layers, said housing having radially extending openings.

2. A screen apparatus for use in well bores according to claim 1 wherein at least said first and second layers are of a unitary bonded construction.

3. A screen apparatus for use in well bores, said apparatus comprising longitudinally extending conduit means having radially extending openings, a fluid permeable screen of granular material positioned about the openings in said conduit means, said screen comprising a first layer of relatively coarse granular material of a unitary resin-bonded construction encompassing and bonded to said conduit means, a second layer of relatively fine granular material of a unitary resin-bonded construction encompassing and bonded to said first layer, a third layer of relatively coarse granular material encompassing said second layer, a housing fixed to said conduit means and encasing said layers, said housing having radially extending openings, said third layer being loosely packed between and loosely confined by said second layer and said housing.

4. A screen apparatus for use in well bores, said apparatus comprising longitudinally extending tubular conduit means having radially extending openings, a fluid permeable screen of granular material positioned about said openings of said conduit means, said screen comprising a first cylindrical layer of relatively coarse granular material of a unitary, resin-bonded construction encompassing and fixed to said conduit means, a second cylindrical layer of relatively fine granular material of a unitary, resin-bonded construction encompassing and fixed to said first layer, a third cylindrical layer of relatively coarse and relatively loosely packed granular material encompassing said second layer, a housing fixed to said conduit means and encasing said layers, said housing having radially extending openings in said conduit means and said housing having at least one dimension less than the average particle size of said granular material of said first and third layers said granular materials of said first and third layers having a substantially equal average particle size.

5. A screen apparatus for use in well bores, said apparatus comprising longitudinally extending conduit means having radially extending openings, a fluid permeable screen of granular material positioned about said openings in said conduit means, said screen comprising a first bonded layer of granular material of a first particle size, said first layer being of a unitary resin-bonded construction, and a second layer of granular material of a second particle size, said second layer being loosely packed adjacent said first layer, and a housing fixed to said conduit means and encasing said layers, said housing including at least one generally cylindrical wall resin bonded to said first layer and having perforations therein.

6. A method of assembling a well screen comprising a plurality of layers of granular material confined between confining elements including a perforated portion of a production string and a perforated housing, said method comprising bonding a first layer of granular material to at least one of said confining elements, positioning a portion of said perforated housing about said perforated portion of said production string so that a space remains adjacent said first layer, loosely packing a second layer of granular material in said space adjacent said first layer, positioning a second portion of said housing so as to confine said layers between said perforated portion of said production string and said housing.

7. A method of assembling a well screen comprising a plurality of layers of granular materal positioned within a housing and about a perforated portion of a production string, said method comprising resin bonding a first layer of granular material about and to said perforated portion of said production string, resin bonding a second layer of granular material about and to said first layer, fixing a first portion of said housing about said perforated portion of said production string so that a space remains between said second layer and said portion of said housing, loosely packing a third layer of granular material in said space to fill the same, and fixing a second portion of said housing to said first portion and said production string to thereby close said housing and confine the layers therein.

8. A screen apparatus for use in well bores, said apparatus comprising first cylindrical wall means, second cylindrical wall means radially spaced from said first cylindrical wall means, radial passage means in each of said first and second wall means, a first generally annular granular mass interposed between said first and second wall means, means bonding the granules of said first annular mass to each other and bonding said first annular mass to one of said wall means, and a second annular mass of loose granular material interposed between said first annular mass and the other of said wall means.

References Cited

UNITED STATES PATENTS

| 1,588,920 | 6/1926 | Trahan et al. | 166—236 |
| 1,992,718 | 2/1935 | Records | 210—496 X |
| 3,064,819 | 11/1962 | Jones | 210—266 |
| 3,148,962 | 9/1964 | Dellinger et al. | 210—290 X |
| 3,173,488 | 3/1965 | Rensvold | 166—228 |

FOREIGN PATENTS 18,806    1906    Great Britain.

OTHER REFERENCES

Read Winterburn: "Application of Gravel Packing to Unconsolidated Sands," The Oil Weekly, Jan. 11, 1943, pp. 17–23.

SAMIH N. ZAHARNA, *Primary Examiner.*